United States Patent

[11] 3,579,050

[72] Inventors Rabindra N. Basu;
 Alfred Dvorak, Ottawa, Ontario, Canada
[21] Appl. No. 832,139
[22] Filed June 11, 1969
[45] Patented May 18, 1971
[73] Assignee Northern Electric Company Limited
 Montreal, Quebec, Canada

[54] HIGH-LOW VOLTAGE DETECTOR
 3 Claims, 1 Drawing Fig.
[52] U.S. Cl. .................................................. 317/148.5,
 317/DIG 5, 307/235
[51] Int. Cl. ....................................................... H01h 47/32
[50] Field of Search.......................................... 307/235,
 130; 317/123 (D), 148.5; 320/39, 40; 328/146,
 148; 340/249

[56] References Cited
 UNITED STATES PATENTS
3,139,562 6/1964 Freeborn...................... 317/148.5
3,465,208 9/1969 Patrickson et al. .......... 307/235(X)

*Primary Examiner*—Lee T. Hix
*Attorney*—Curphey and Erickson

ABSTRACT: A solid-state circuit for monitoring low and high voltage conditions in either direct current or alternating current voltage sources. A single transistor in a current control circuit is biased into or out of current conduction by two sample voltages which are related to the monitored voltage. The current flow is detected. For all values of the first sample voltage which exceed a predetermined minimum value the current control circuit will conduct current, provided also that the second sample voltage does not exceed a predetermined maximum value. Irrespective of the value of the first sample voltage, the current control circuit will cease current conduction when the second sample voltage exceeds the predetermined maximum value. The minimum and maximum sample voltage values define boundary conditions which correspond respectively to the low and high values of the monitored voltage.

Patented May 18, 1971
3,579,050
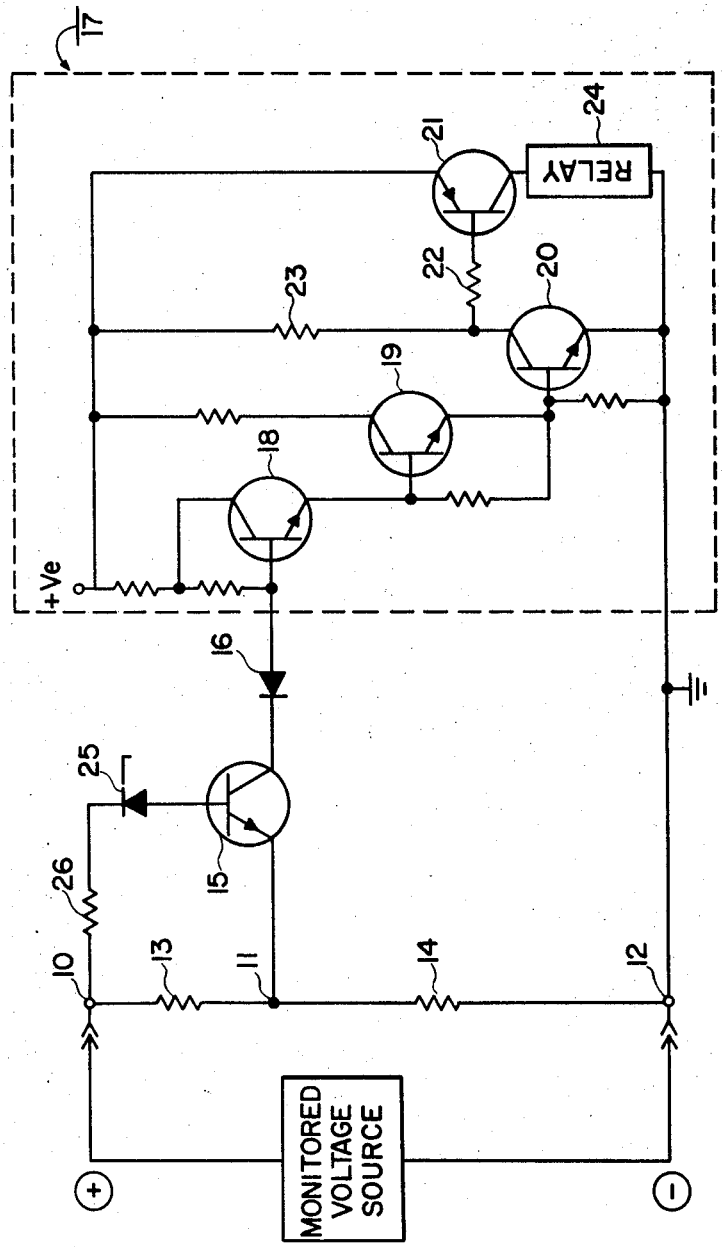
INVENTORS
RABINDRA NATH BASU
ALFRED DVORAK
BY *Curphey + Erickson*
PATENT AGENTS

HIGH-LOW VOLTAGE DETECTOR

This invention relates to voltage detection circuits and more particularly to such circuits which are responsive to voltages that may be greater or less than a predetermined reference voltage.

In the telephone industry, wet-cell batteries are commonly used to supply power for telephones in the event of AC power line failure. Usually the output voltage of a regulated battery charger connected across the battery is set to a predetermined value, and the battery is maintained at this voltage in a fully charged condition, the current for the telephone system being supplied from the battery charger.

The predetermined voltage applied to the battery by the charger must be maintained within close limits since an overvoltage condition will cause the generation of hydrogen gas with an attendant water loss in the battery. In addition to reducing the capacity of the battery, the resultant exposure of the battery plates to the atmosphere causes oxidation of the negative plates which will make the battery unusable. It is therefore desirable that an alarm be actuated should excessive voltage be applied to the battery. On the other hand, it is equally important that the alarm be actuated if the battery voltage drops below some minimum value required for proper operation of the telephone system.

Another common telephone system application in which high and low voltage conditions are encountered, and in which it is desirable to be aware of voltage irregularities, is the monitoring of tone and ringing generators. In this situation, the monitoring of signal voltage outputs from such generators is commonly done as a preventive maintenance measure.

In the first mentioned application, monitoring functions have previously been made by means of high-low voltmeters which are essentially meter movements having a plurality of contacts, one of which moves with the armature. Such devices in addition to being expensive, are sensitive to physical shock and vibration.

At the present time, U.S. Pat. No. 3,341,748, issued on Sept. 12, 1967 to N. A. Kammiller, discloses an all-electronic, high-low voltage sensitive signalling circuit, utilizing semiconductors, which overcomes most of the preceding objections. The Kammiller circuit does, however, suffer from complexity of design which results in relatively high manufacturing costs due to the large numbers of expensive components that are required. Moreover, as a result of this complexity the circuit would be difficult to adjust and maintain under field use conditions.

By means of the invention disclosed herein such disadvantages are overcome because only a single current control device is used to detect both high and low level voltage conditions. A less complex circuit is used which is more economical to manufacture, and which is perforce more easily maintained and adjusted in the field.

It has been discovered that a single transistor may be used to detect both a high voltage and a low voltage condition by a suitable bias voltage arrangements between (1) the base and the emitter, and (2) the collector and emitter of the transistor. In the first case, current does not flow through the transistor until a first sample voltage exceeds a reference voltage which is used reverse bias the base and emitter electrodes of the transistor. Since the collector at this time is forward biased with respect to the emitter, a current flow will occur through the transistor and may be used to activate a current sensing circuit. Accordingly, a voltage of a first predetermined magnitude may thus be determined. In the second case, where an indication is required when the monitored voltage exceeds a second predetermined value, the transistor is turned off when a second sample voltage, applied to the emitter, is equal to that of the voltage applied to the collector of the transistor. In this situation, the collector to emitter junctions become unbiased, with the result that current no longer flows through the transistor. At this point the current detecting circuit becomes deactivated and indicates one of two conditions, that the monitored voltage magnitude has fallen below the first predetermined value, or else that the monitored voltage magnitude or exceeds the second predetermined value.

The invention herein disclosed is a high-low voltage detection circuit for monitoring a voltage. The circuit comprises a pair of input terminals for connection to a voltage source and first and second resistors serially connected across the input terminals. The emitter terminal of a transistor having emitter, base and collector terminals, is connected to the junction of the first and second resistors. A Zener diode is connected between the base terminal and the junction of the first resistor and one of the input terminals, in a direction reverse to the forward flow of current at the base terminal. The input of a direct current detection means is connected, via a connecting means, between the collector terminal and the junction between said second resistor and the other input terminal, said input having a preselected voltage thereacross. The impedance of the first and second resistors and the reverse breakdown voltage of said Zener diode are selected so that the transistor will conduct only when the voltage across the Zener diode, in its reverse conducting region, exceeds the voltage across the first resistor and the voltage across the second resistor is less than said preselected voltage to provide a high-low voltage indication.

A practical embodiment of the invention herein disclosed will be fully understood from the following detailed description taken in connection with the appended drawing in which the FIG. is a schematic diagram of a voltage detection circuit.

The FIG. shows a voltage divider means in the form of a simple resistive voltage divider having a first terminal 10, a second terminal 11, and a third terminal 12. A first resistor 13, is connected between the terminals 10 and 11 and a second resistor 14 is connected between the terminals 11 and 12. The terminals 10 and 12 are connected across a voltage source to be monitored. A coupling diode 16 is connected to the collector electrode of a transistor 15. A Zener diode 29 and a base current limiting resistor 26 are serially connected between the first terminal 10 and the base electrode of transistor 15. The emitter electrode of transistor 15 is connected to the terminal 11.

The input of a direct current detection means 17 is connected between the diode 16 and the third terminal 12. The direct current detection means 17 is shown in the FIG. as a conventional three-stage direct-current coupled transistor amplifier including transistors 18, 19, 20, 21, a base resistor 22, a collector resistor 23 and a relay 24. The relay 24 in the collector circuit of the transistor 21 is used to make connections to external circuits, not shown in the FIG., for the purpose of obtaining any desired form of signal to indicate that the bounds of monitored voltage have been traversed.

To fully comprehend the nature of the invention herein disclosed, consideration should be next given to the operation of the voltage detection circuit in the FIG. When the terminals 10 and 12 are connected across the source of monitored voltage, a current flows through the resistors 13 and 14. A first sample voltage developed across the resistor 13 is available at the terminals 10 and 11. The Zener diode 25 is reverse biased by the first sample voltage and acts as an open circuit unless the magnitude of the first sample voltage exceeds the breakdown voltage of the Zener diode 25. Accordingly, base bias current will not flow until this magnitude of first sample voltage is reached. Therefore, the transistor 15 is first able to conduct current when the monitored voltage rises to a sufficiently large value so that the first sample voltage just exceeds the breakdown voltage of the Zener diode 25. The magnitude of the first sample voltage at this instant occurs at the first predetermined value of the monitored voltage.

The collector electrode of the transistor 15 is forward biased with respect to its emitter electrode as a result of a positive comparison voltage at the base electrode of the transistor 18. The positive direct current voltage at this point is the sum of the emitter base voltage drops of the transistors 18, 19 and 20. This positive voltage is applied to the anode of the coupling diode 16, which becomes forward biased, and acts as a closed switch, applying this comparison voltage to the collector of the transistor 15. Since the base electrode is forward biased with respect to the emitter electrode of the transistor 15 at this time, then the transistor 15 conducts current and also acts as a closed switch, thereby connecting the voltage which appears at the terminal 11 through the coupling diode 16 to the base electrode of the transistor 18.

As the magnitude of the monitored voltage increases, a second sample voltage developed across the resistor 14 and appearing at the terminal 11 likewise increases. When the second predetermined value of the monitored voltage is reached, the voltage at the terminal 11 becomes equivalent to the voltage developed at the base of the transistor 18. In this situation, the coupling diode 16 becomes unbiased since its cathode and anode voltages are of the same magnitude and polarity. Accordingly, the coupling diode 16 acts as an open circuit switch and breaks the current path for the transistor 15, causing it to cease current conduction in its emitter-collector circuit. Thus, the voltage which appears at the terminal 11 is disconnected from the base electrode of the transistor 18. It is worth noting that the circuit will perform in a similar manner even though the coupling diode 16 is removed and the collector of the transistor 15 is connected directly to the base electrode of the transistor 18. In this situation the transistor 15 will also act as an open switch circuit when its emitter and collector voltages are of the same magnitude and polarity. The coupling diode 16 is preferred in the circuit since it provides a sharper cutoff characteristic than does the transistor 15 alone.

When the transistor 15 is turned off, or open-circuited, as for example when the monitored voltage is of an insufficient value to cause forward biasing of the base electrode with respect to the emitter electrode, then the comparison voltage at the base of the transistor 18 is sufficient to cause the transistor 18 to go into current conduction. Current through the transistor 18 increases, and causes the transistor 19 to be forward biased which also conducts current, and in turn forward biases the transistor 20. The transistor 20 conducts current, and acts effectively as a closed switch to connect the base resistor 22 to the terminal 12. This action forward biases the transistor 21, causing it to conduct current, and to energize the relay 24 in its collector circuit. Thus, the relay 24 operates when the transistor 15 is turned off. Conversely, when the transistor 15 is turned on, and it acts as a closed switch, as previously described, the voltage developed at the terminal 11 is applied through the coupling diode 16 to the base of the transistor 18 causing that transistor to be turned off. As a result, the transistor 19 goes off, and the transistor 20 likewise is turned off. Therefore, the base resistor 22 is connected through the collector resistor 23 back to the emitter of the transistor 21 which causes that transistor to be turned off. The result is that the relay 24 is deenergized. Thus, the relay is inoperative when the transistor 15 is turned on.

The preceding description has shown that for all values of monitored voltage which are less than a first predetermined value, i.e., where the corresponding first sample voltage is less than the breakdown voltage of the Zener diode 25, the transistor 15 is turned off, and the relay 24 is energized. Furthermore, when the monitored voltage is greater than a second predetermined value, i.e., where the corresponding first sample voltage is greater than the breakdown voltage of the Zener diode 25, and the corresponding second sample voltage is just equal to the comparison voltage at the base electrode of the transistor 18, the transistor 15 is again turned off, and the relay is energized. For all values of monitored voltage between these two limits, the transistor 15 conducts current, and the relay is deenergized. This mode of relay operation has been chosen since electric power is conserved. The transistor 15 is normally in a current conduction state, and the relay 24 is normally deenergized.

The monitored voltage is shown as a direct-current voltage with its positive termal connected to the terminal 10 and its negative terminal connected to the terminal 12 of the resistive voltage divider circuit in order to generate sample voltages of a polarity suitable to operate the voltage detection circuit. The voltage detection circuit however, may also be used to monitor an alternating current voltage, in which case the circuit operates only during the positive half-wave portion of the alternating current voltage waveform. It is of course required that suitable changes be made to the circuit 17 so as to make it insensitive to the rapid variations in the monitored alternating current voltage. One suggested change is to connect a capacitor of a large value across the field winding of the relay 24. This will sustain current flow through the relay field winding during the negative half-wave portion of the alternating current voltage and should thereby prevent relay chatter which otherwise would develop. As a result of this change, short term variations in the monitored alternating current voltage would not be detected, i.e., voltage variations occurring only during several cycles, but, any relatively slow variations in amplitude occurring over many cycles would still be detected.

We claim:

1. A high-low voltage detection circuit for monitoring a voltage from a voltage source, the circuit comprising:
   a pair of input terminals for connection to the voltage source;
   first and second resistors serially connected across the input terminals;
   a transistor having emitter, base and collector terminals, the emitter terminal being connected to the junction of the first and second resistors;
   a Zener diode connected between the junction of the first resistor and one of the input terminals, and the base terminal, in series opposition to the forward flow of current at the base terminal;
   a direct-current detection means having an input, the input having a preselected voltage thereacross; and
   said input being connected between the collector terminal and the junction between the second resistor and the other input terminal;
   the impedance of said first and second resistors and the reverse breakdown voltage of said Zener diode being selected so that the transistor will conduct only when the voltage across said Zener diode in its reverse conducting region exceeds the voltage across the first resistor and the voltage across said second resistor is less than said preselected voltage to provide a high-low voltage indication.

2. The high-low voltage detection circuit in claim 1, further comprising:
   a base current limiting resistor connected in series with the Zener diode.

3. The high-low voltage detection circuit in claims 1 or 8, further comprising:
   a diode connected in series with the collector terminal in such direction that the diode is in series aiding with the base-emitter junction of the transistor.